United States Patent [19]

Konishi

[11] 4,399,880

[45] Aug. 23, 1983

[54] COMBINATORIAL WEIGHING SYSTEM

[75] Inventor: Satoshi Konishi, Shiga, Japan

[73] Assignee: Kabushiki Kaisha Ishida Koko Seisakusho, Kyoto, Japan

[21] Appl. No.: 337,944

[22] Filed: Jan. 7, 1982

[30] Foreign Application Priority Data

Jan. 27, 1981 [JP] Japan ................................. 56-11318
Jun. 27, 1981 [JP] Japan ................................ 56-100088
Dec. 22, 1981 [JP] Japan ................................ 56-208828

[51] Int. Cl.³ .......................................... G01G 19/32
[52] U.S. Cl. ........................................ 177/1; 177/25; 177/59
[58] Field of Search ................. 177/1, 25, 59, 90–102, 177/123, 145; 209/592

[56] References Cited

U.S. PATENT DOCUMENTS 3,939,928 2/1976 Murakami ............................ 177/25
4,267,894 5/1981 Hirano ................................. 177/25
4,344,492 8/1982 Hirano ................................. 177/25

Primary Examiner—Joseph W. Hartary
Attorney, Agent, or Firm—Armstrong, Nikaido, Marmelstein & Kubovcik

[57] ABSTRACT

A combinatorial weighing system designed for weighing out a desired number or weight of articles, wherein groups of articles are respectively weighed by a plurality of weighing machines, combinatorial addition is performed on all or a fixed number of possible combinations for weighed values obtained, a particular combination whose combination value is equal or the closest to a set value is selected, and articles are discharged from the weighing hoppers corresponding to the selected combination. It is contemplated to improve performance of this system by ensuring that groups of articles successively discharged from the weighing hoppers are collected separately one from the other without intermingling. To that end, the weighing hopper may have two discharge ports so as to discharge articles toward different discharge paths defined in a chute.

10 Claims, 19 Drawing Figures

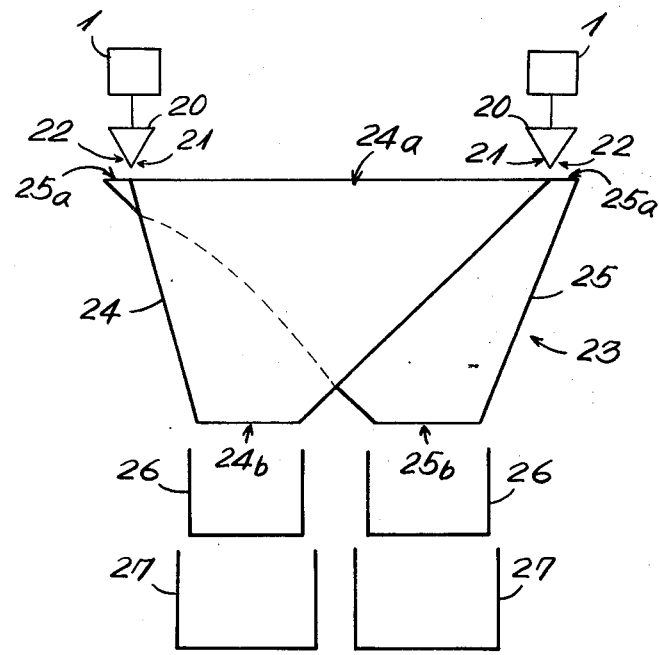
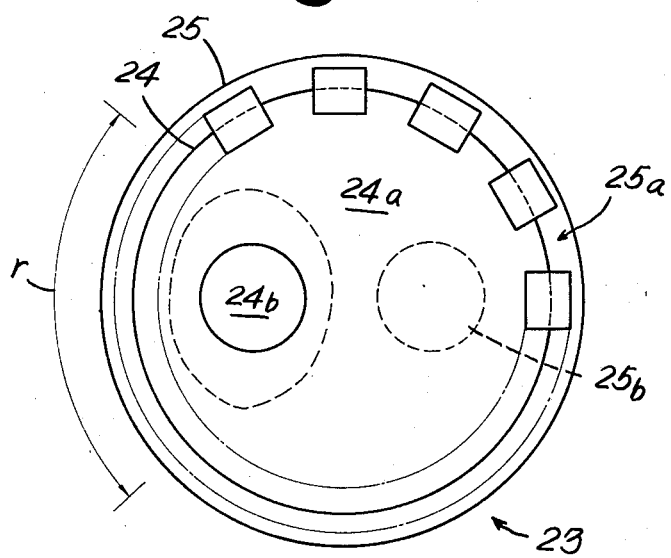

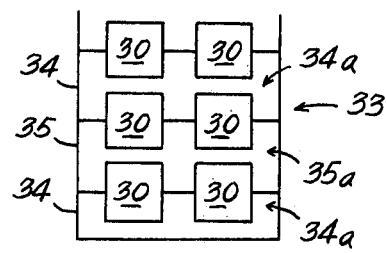
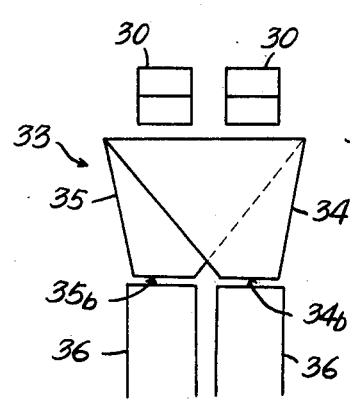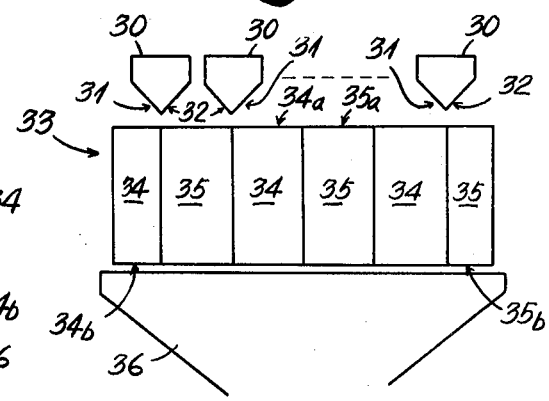

COMBINATORIAL WEIGHING SYSTEM

The present invention relates to a combinatorial weighing system and more particularly to a method and apparatus for collecting articles weighed out in such a combinatorial weighing system.

A combinatorial weighing system comprising a plurality of weighing sections, computes combinations on the basis of weight values indicated by the weighing sections, searches for a particular combination whose addition value is equal or closest to a set value (weight or number of articles) and decides it as a combination for discharge.

The combinatorial weighing and collection of articles weighed out in this type of combinatorial weighing system are performed, for example, in the following manner: Groups of articles fed into a plurality of weighing hoppers are weighed by weighing machines associated with the weighing hoppers, addition values are computed of any desired number of combinations or all possible combinations of the weight values thus obtained, the addition values are individually compared with a set weight to find a particular combination whose addition value is equal or closest to the set weight, and articles are discharged from the corresponding hoppers into a discharge chute and then collected in a timing hopper. There is another arrangement wherein weight values indicated by the weighing machines are each divided by the single-article weight to convert each value into the number of articles, addition is performed on each of the combinations of these numbers to find a particular addition value equal or closest to a set number and articles are discharged and collected.

In each case, very accurate computations can be performed but recently there has been a requirement for improved weighing capability. In order to improve weighing capability, however, it is important to increase the feed rate, weighing rate and discharge rate of articles and to efficiently collect articles discharged in each weighing operation.

Of these three rates, it is possible to increase the weighing and discharge rates, but what matters most is the rate of collection of articles. More particularly, collection of articles, which are selected by combinatorial operation and discharged, at, e.g., twice the conventional rate of collection is attended with a difficulty that because of the distance between respective weighing hoppers and the timing hopper, articles discharged the last time mix with those discharged this time. Further, if the number of weighing machines is increased to increase the weighing accuracy, the chute must be correspondingly increased in size and the distance referred to above becomes longer. As a result, articles discharged in two successive operations mix with each other or articles fall at a greater speed and collide against articles at the discharge port of the collecting chute, with possible damage to these articles.

The present invention is intended to solve the prior art problems described above and improve the capability of the combinatorial weighing system.

In another embodiment of the invention, combinations are computed of the weight values of articles fed into weighing hoppers having two discharge ports to find an optimum combination, and then the weighing hoppers corresponding to this optimum combination are caused to selectively open one of their respective two discharge ports in response to different fall signals, so that articles are dividedly discharged into the chute sections of a chute divided or partitioned in connection with the discharge ports of the weighing hoppers. Therefore, when articles are to be collected, they can be discharged separately through the chute sections from either of the two discharge ports of each weighing hopper, so that even if they are combinatorially selected and discharged at twice the usual speed, it is possible to separately discharge groups of articles in each cycle, avoiding the mixing of articles, and improving the weighing capability and collecting operation. Further, since the construction is simple, the invention can be embodied at low cost; thus, it is economical. The invention can be applied to a large-sized collecting chute and improved weighing accuracy can be easily attained by increasing the number of weighing machines, which is allowed by the use of such large-sized collecting chute. Thus the invention is very useful.

In a further embodiment of the invention, combinations are computed of weight values from the 1st to mth of n weighing sections installed on a chute to obtain an optimum combination, and combinations are then computed of weight values from the remaining weighing sections which have not been selected in the preceding combinatorial operation and from the (m+1)th to nth weighing sections to find an optimum combination, and articles are discharged into the inner and outer chute sections of the chute, so that it is possible to increase the weighing and discharge rates of articles. Since the (m+1)th to nth weighing sections take part in the combinatorial operation only every second time, if it is so arranged that articles from the hopper sections of the weighing sections are discharged into the inner chute section of the chute, then the outer chute section corresponding to these weighing sections becomes unnecessary. Therefore, the chute has removed therefrom part of the outer chute section which forms a narrow discharge path, so that the chute has no bypass, and the bottom surface thereof is a substantially linear inclined surface, greatly increasing the collecting rate of articles. Further, the chute becomes simple in shape and easy to manufacture.

These and other objects and features of the invention will become more apparent from the following description to be given with reference to the accompanying drawings, in which:

FIG. 1 is a schematic elevational sectional view showing an embodiment of an article collecting apparatus in a combinatorial weighing system according to the invention;

FIG. 2 is a plan view of the apparatus of FIG. 1;

FIG. 6 is a schematic front view showing a modification of the apparatus of FIG. 1;

FIG. 7 is a schematic plan view of the apparatus of FIG. 6;

FIG. 8 is a schematic side view of the apparatus of FIG. 6;

Figure 3:
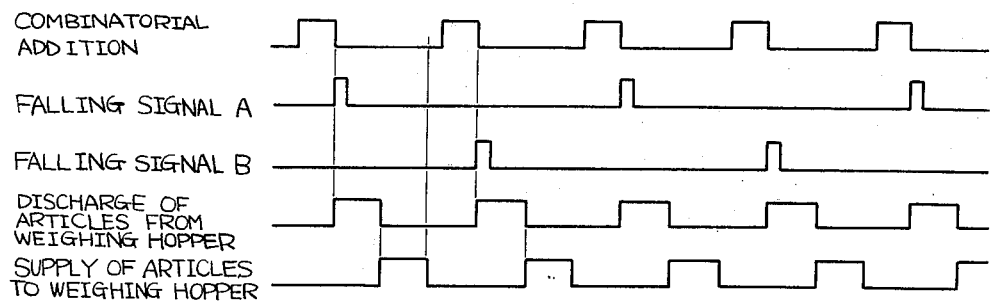
FIGS. 3 to 5 are time charts each showing an operation timing for the apparatus of FIG. 1.

Referring to FIGS. 1 and 2, weighing hoppers are denoted by 20, the weighing hoppers being of the double-outlet type having two discharge ports 21 and 22. The numeral 23 denotes a chute of double construction comprising substantially conical inner and outer chute sections 24 and 25 crossing each other, and inlet ports 24a and 25a arranged in two circles one within the other and discharge ports 24b and 25b in bifurcated form. The numeral 26 denotes a timing hopper; and 27 denotes buckets operatively connected to a packaging machine or the like.

The inner and outer chute sections 24 and 25 of the chute 23 cross each other; the timing (for a fall signal A in FIGS. 3 to 5 to be later described) is such that articles from a plurality of weighing hoppers (about two or three weighing hoppers) disposed in a position (indicated by arrow r in FIG. 2) where the intersection line of the inner and outer chute sections is nearly horizontal will be always discharged into the inner chute section 24.

The manner of collecting articles by the apparatus described above will now be described with reference to timing charts for fall signals shown in FIGS. 3 to 5.

Figure 4:
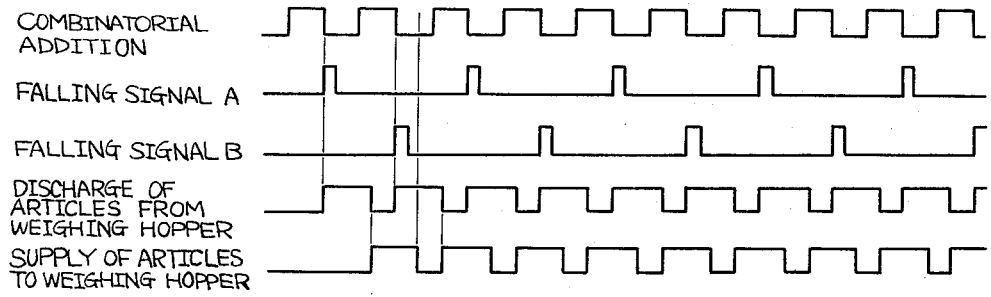
Figure 5:
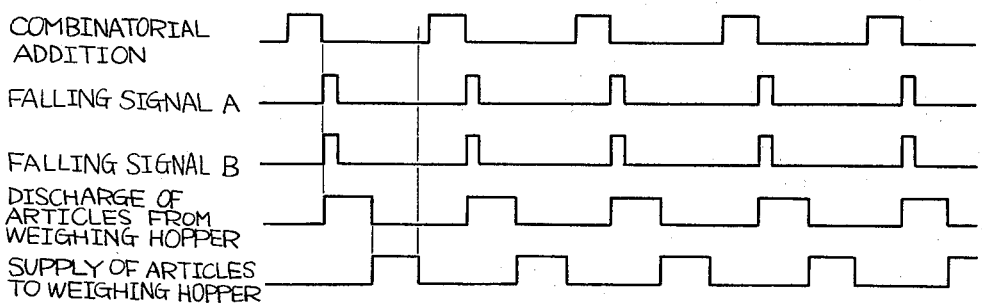

FIGS. 3 and 4 refer to a case where each time combinations of weight values are computed, a particular combination whose addition value is equal or closest to a set weight is selected and articles are discharged from the weighing hoppers corresponding to the selected combination, wherein fall signals A and B are alternately delivered in connection with respective operations of combinatorial addition. In the case of FIG. 4, during discharge of articles selected in the last operation of combinatorial addition and during feeding of articles to weighing hoppers which are now empty, the next operation of combinatorial addition is performed on the weight values of articles not selected the last time and/or weight values not used in the last operation of combinatorial addition. FIG. 5 refers to a case where in each operation of combinatorial addition, a combination whose addition value is equal or closest to a set weight and another combination whose addition values is the second closest are obtained and the two sets of articles corresponding to these two combinations are simultaneously and separately discharged on the basis of fall signal A and B which are issued at the same time.

Groups of articles fed to the weighing hoppers are weighed by the associated weighing machines 1 and addition is performed on each combination of the indicated weight values to select a combination whose addition value is equal or closest to a set weight, and the weighing hoppers corresponding to the selected combination are caused to open one of their respective discharge ports 21 and 22 to discharge the articles into the chute 23. With the timing for the fall signal A shown in FIG. 3, the articles corresponding to the selected combination are discharged from the discharge ports 21 of the weighing hoppers 20 into the inner chute section 24 of the chute 23, and with the timing for the fall signal B shown in FIG. 3, the articles corresponding to the selected combination are discharged from the discharge ports 22 of the weighing hoppers 20 into the outer chute section 25.

Thus, the method and apparatus for collecting articles according to this embodiment of the invention are designed to discharge articles from the discharge ports 21 and 22 of the weighing hoppers 20 at a suitable time interval separately into the inner and outer chute sections 24 and 25 of the chute 23. Thus, if capability to combinatorially selectively discharge articles from the discharge ports 21 and 22 of the weighing hoppers 20 is n times/min, then it follows that the capability to collect articles through the timing hoppers 26 is such that the inner and outer chute sections 24 and each operate n/2 times/min in the case of FIGS. 3 and 4 and n times/min in the case of FIG. 5. In addition, since the inner and outer chute sections 24 and 25 cross each other in the region indicated by the arrow r in FIG. 2, as described above, articles from a plurality of weighing hoppers disposed in that region will be always discharged into the inner chute section 24. Articles discharged from either of the inner and outer chute sections 24 and 25 in the manner described above are respectively collected in the timing hoppers therebelow, and the collected articles are discharged into the buckets therebelow as soon as the timing hoppers are opened.

FIGS. 6 to 8 show a modification of the embodiment described above with reference to FIGS. 1 and 2.

In this modification, the circular arrangement of weighing hoppers 20 in the above embodiment is replaced by a linear arrangement wherein weighing hoppers 30 are arranged in two lines above and longitudinally of a chute 33 having numbers of chute sections 34 and 35 of required width separated from each other. More particularly, first discharge ports 31 of the weighing hoppers 30 are disposed on both sides above the inlet ports 34a of the chute sections 34 of the chute 33 and second discharge ports 32 of the weighing hoppers 30 are disposed on both sides above the inlet ports 35a of the chute sections 35 of the chute 33. As for the timing for fall signals, it is so arranged that articles are discharged from the discharge ports 31 of the weighing hoppers 30 into the chute sections 34 of the chute 33 when selection is made with the timing for the fall signal A shown in FIG. 3 and from the discharge ports 32 of the weighing hoppers 30 into the chute sections 35 of the chute 33 with the timing for the fall signal B. Collection chutes 36 are respectively provided below the discharge ports 34b and 35b of the chute sections 34 and 35 of the chute 33 for collecting articles discharged from the chute sections 34 and 35 and then discharging them to the next processing step. As compared with the circular arrangement in the above embodiment, the chute configuration is simple and there is no need to adjust the timing for fall signals owing to the crossing of the inner and outer chute sections, a fact which leads to improved weighing accuracy.

Figure 10:
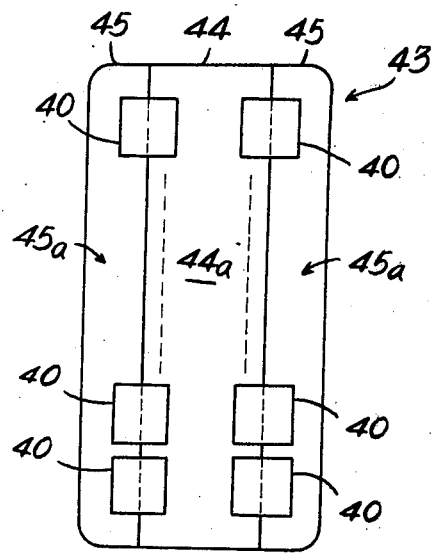
FIG. 10 is a schematic plan view of the apparatus of FIG. 9.
Figure 9:
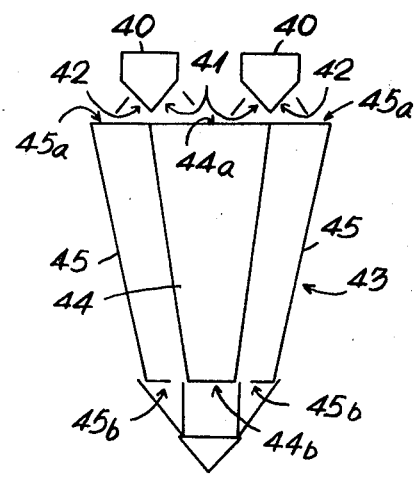
FIG. 9 is a schematic front view showing another modification of the apparatus of FIG. 1.
Figure 11:
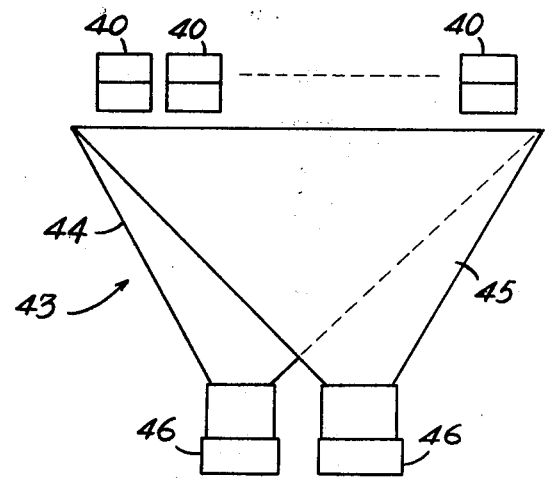
FIG. 11 is a schematic side view of the apparatus of FIG. 10.

FIGS. 9 to 11 show another modification of the embodiment described above with reference to FIGS. 1 and 2.

In this modification, as in the first modification, weighing hoppers 40 are linearly arranged in such a manner that the weighing hoppers 40 are disposed on both sides above and longitudinally of a chute 43 which comprises three longitudinally extending chute sections, namely, a central chute section 41 and two lateral chute sections 45. First discharge ports 41 of the weighing hoppers 40 are disposed on both sides above the inlet port 44a of the central chute section 44 of the chute 43, and second discharge ports 42 of the weighing hoppers 40 are disposed above the inlet ports 45a of the lateral chute sections 45. The timing for fall signals is set in the same manner as in the first modification. Thus, the timing for the fall signal B in FIG. 3 is set such that articles are discharged from the discharge ports 45 of the weighing hoppers 40 into the lateral chute sections 45 of the chute 43 at the same time. Timing hoppers 46 are provided below the discharge port 44b of the central chute section 44 of the chute 43 and below the discharge ports 45b of the lateral chute sections 45 for collecting articles discharged from the central and lateral chute sections 44 and 45.

Figure 12:
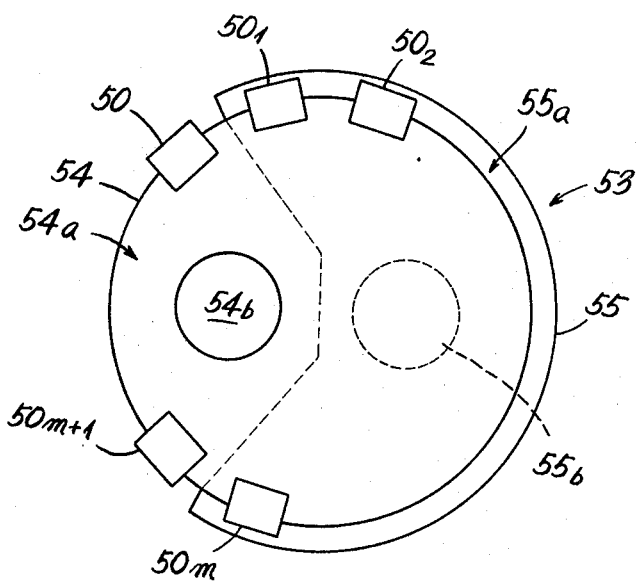
FIG. 12 is a schematic plan view showing a further modification of the apparatus of FIG. 1.
Figure 13:
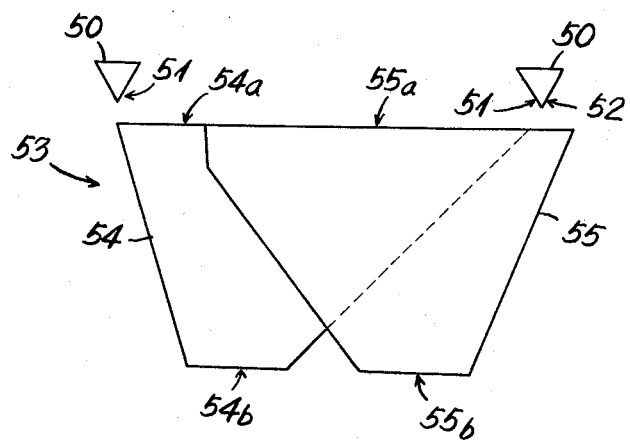
FIG. 13 is a side view of the apparatus of FIG. 12.

FIGS. 12 and 13 show another modification of the embodiment shown in FIGS. 1 and 2.

With the chute 23 in the embodiment described above, the inner and outer chute sections 24 and 25 differ in the capability to discharge articles, presenting various problems. The inner chute section 24 is internally in the form of a cone having a steep slope, while the outer chute section 25 has a steep slope in a region nearer to the discharge port 25b but a gentle slope in a farther region and is bifurcated as it bypasses the periphery of the inner chute section 24, defining a long discharge path which results in a reduced rate of article discharge. As a result, the timing for discharge of articles in combinatorial weighing becomes inaccurate. Further, in the bypass portion of the outer chute section 25, a narrow discharge path is defined between the inner and outer chute sections 24 and 25, causing a bridge phenomenon depending upon the kind of the articles, which may make it impossible to discharge articles. Further, the configuration of the outer chute section 25 is so complicated that it is hard to fabricate.

In FIGS. 12 and 13, the numeral 53 denotes a chute comprising an inverted frustoconical inner chute section 54 and an outer chute section 55, these sections being arranged so that their upper openings 54a and 55a are concentric with each other and they cross each other such that they do not communicate with each other, their lower discharge ports 54b and 55b being disposed side by side. A portion of the outer chute section 55 is removed in a region where the outer peripheral surface of the inner chute 54 and the outer chute 55 define a narrow discharge path therebetween and where the bottom surface presents a gentle slope. A large number (n) of weighing hoppers 50 are arranged in a circle above the chute 53 and on the boundary between the inner and outer chute sections 54 and 55. The hoppers 50 are each provided with an independent article feeder (not shown), so that when hoppers 50 have discharged articles to become empty, the associated feeders feed a suitable amount or number of articles to the hoppers 50. Of these n weighing hoppers 50, the 1st through mth weighing hoppers $50_1$, $50_2$ ... $50_m$ (where m<n) disposed to overlap the inner and outer chute sections 54 and 55 have inwardly and outwardly directed discharge ports 51 and 52, while the (m+1)th to nth weighing hoppers $50_{m+1}$ ... $50_n$ disposed over the edge of the inner chute section 54 have only an inwardly directed discharge port 51.

In operation, the n weighing hoppers are fed with articles in suitable amounts or numbers from the respective feeders and the groups of articles fed thereto are weighed by the associated weighing machines. Combinations are computed of the weight values indicated by the weighing machines corresponding to the 1st to mth weighing hoppers $50_1$ ... $50_m$ to select a particular combination whose addition value is equal or closest to a set weight or number. Combinations are then computed of the weight values indicated by the weighing machines corresponding to those of the 1st to mth weighing hoppers $50_1$ ... $50_m$ which were not selected in the last combinatorial operation and the weight values indicated by the weighing machines corresponding to the (m+1)th and nth weighing hoppers $50_{m+1}$ ... $50_n$ which did not take part in the last combinatorial operation, so as to select a combination whose addition value is equal or closest to the set weight or number. The discharge ports 52 of the weighing hoppers corresponding to the combination selected in the last combinatorial operation are opened to discharge the articles therein into the outer chute section 55 to collect the articles in the latter, the collected articles being discharged through the discharge port 55b of the outer chute section 55, while the inner discharge ports 51 of the weighing hoppers corresponding to the combination selected in the combinatorial operation this time are opened to discharge the articles therein into the inner chute section 54 to collect the articles in the latter, the collected articles being discharged through the discharge port 54b thereof. The now-empty hoppers are fed with articles in suitable amount or numer from the corresponding article feeders and the above operations are repeated to successively select two discrete optimum combinations whose addition values are each equal or closest to the set weight or number, discharging the articles into the inner and outer chute sections 54 and 55 of the chute 53, thus collecting them in two systems.

In the above description, after two combinations have been obtained, the discharge ports of the corresponding weighing hoppers are opened to discharge the articles at the same time. However, each time one combination is obtained, the articles may be discharged from the corresponding hoppers into the predetermined chute alternately.

Figure 14:
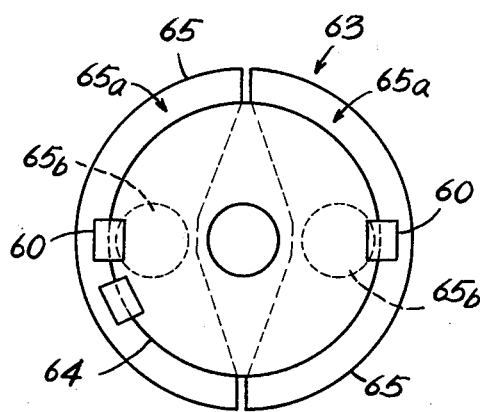
FIG. 14 is a schematic plan view showing a further modification of the apparatus of FIG. 1.
Figure 15:
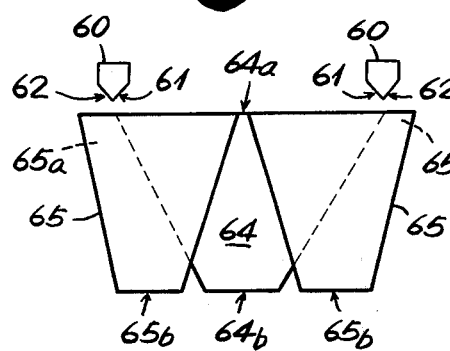
FIG. 15 is a schematic side view of the apparatus of FIG. 14.

The embodiments incorporating two discharge paths have been described. However, the number of discharge paths is not limited to two but may be more than two. The layout of an apparatus having three discharge paths is shown in FIGS. 14 and 15. In this embodiment, n weighing sections (each comprising at least a weighing machine and a weighing hopper 60 having two discharge ports) are used, and combinations are computed to select three combinations which satisfy a set value to discharge articles through three discharge ports. A chute 63 comprises an inner chute section 64 and two outer chute sections 65, the inner chute section 64 being inverted frustoconical, having an inlet port 64a and a discharge port 64b, the outer chute sections 65 each being substantially semicircular in plan view, having an inlet port 65a and a discharge port 65b. The weighing hoppers 60 having two discharge ports 61 and 62 are disposed above the boundary between the inner and outer chute sections 64 and 65 so that they can discharge in either side.

The method of computation in this apparatus will now be described. Combinations are computed of weight data from the 1st to (n/2)th weighing sections and from the (n/2+1)th to nth weighing sections to decide two optimum combinations $O_1$ and $O_2$. Combinations are then computed of weight data from the 1st to nth, i.e., all weighing sections, except those corresponding to the optimum combinations, to decide an optimum combination I. The weighing hoppers of the weighing sections corresponding to these combinations $O_1$, $O_2$ and I are opened for discharge. In this case, articles corresponding to the combinations $O_1$ and $O_2$ are discharged into the outer chute sections 65 and articles corresponding to the combination I are discharged into the inner chute section 64. The weighing hoppers which have discharged are newly fed with articles and the same operation repeated.

Figure 16:
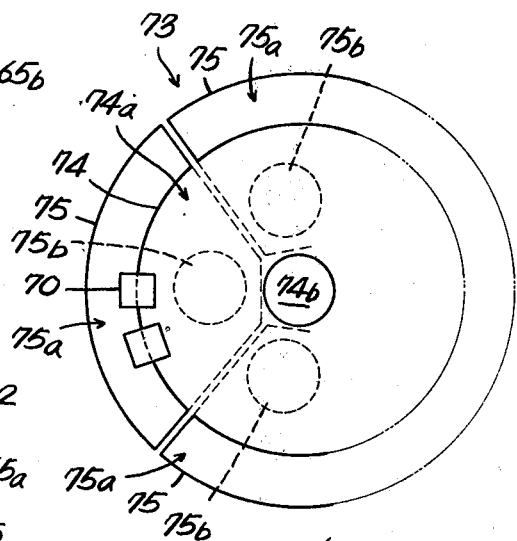
FIG. 16 is a schematic plan view showing a still another modification of the apparatus shown in FIG. 1.
Figure 17:
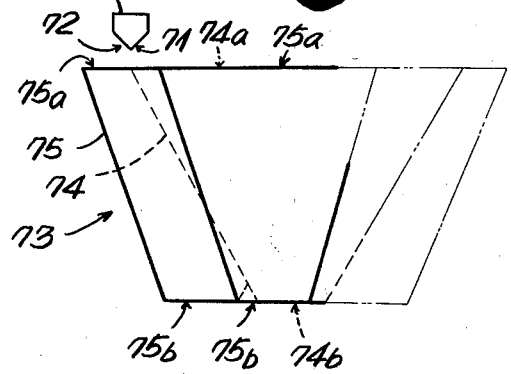
FIG. 17 is a schematic side view of the apparatus shown in FIG. 16.

An arrangement in which four or more, e.g., M, discharge paths are provided is shown in FIGS. 16 and 17. A chute 73 comprises an inverted frusto-conical inner chute section 74 and M−1 outer chute sections each having an inlet port 75a and a discharge port 75b. In this case, combinations are computed of weight data from $n/(M-1)$ weighing sections disposed above the outer chute sections 75 to decide the optimum combinations $O_1 \ldots O_{M-1}$, and combinations are computed of weight data from the n or all weighing sections except those 25 corresponding to the combinations $O_1 \ldots O_{M-1}$ to decide the optimum combination I. The weighing hoppers 70 of the weighing sections corresponding to these combinations $O_1 \ldots O_{M-1}$ and I are opened for discharge. In this case, for the combinations $O_1 \ldots O_{M-1}$, those discharge ports which discharge into the outer chute sections 75, i.e., the outer discharge ports 72 of the weighing hoppers 70 are opened. For the combination I, those discharge ports which discharge into the inner chute section 74, i.e., the inner discharge ports 71 of the weighing hoppers 70 are opened. The hoppers which have discharged are fed with articles for the next combinatorial operation, and the operation is repeated.

Figure 18:
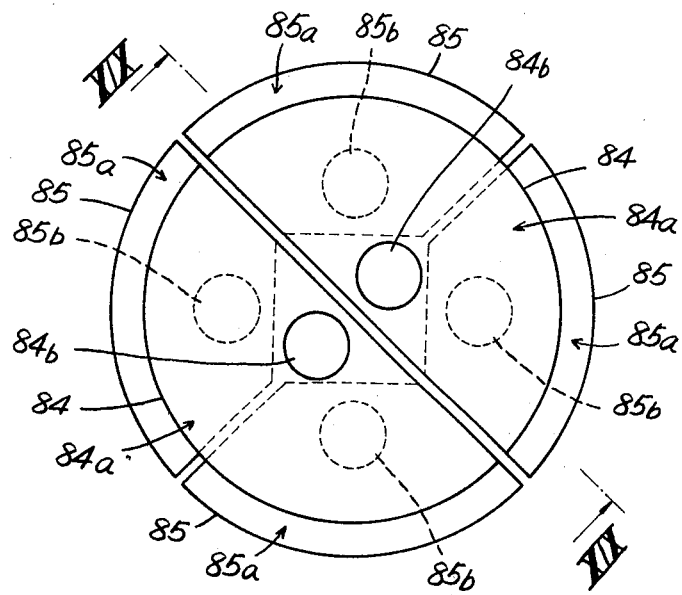
FIG. 18 is a schematic plan view similar to FIG. 2, showing a further modification of FIG. 1 embodiment.
Figure 19:
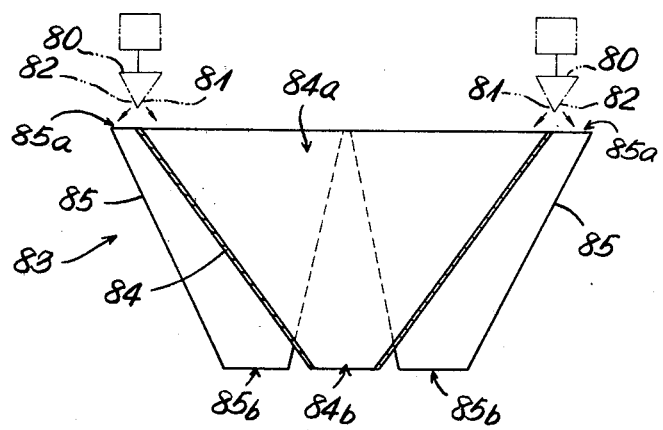
FIG. 19 is a schematic sectional view taken along the line XIX—XIX of FIG. 18.

The embodiments described so far show a single inner chute section, which however, may be of plural. Referring to FIGS. 18 and 19, a chute 83 comprises two inner chute sections 84 and four outer chute sections 85. Each of the inner chute sections 84 has an inlet port 84a and a discharge port 84b while each of the outer chute sections 85 has an inlet port 85a and a discharge port 85b. Provided above the chute 83 as shown by the phantom lines in FIG. 19 is a plurality of weighing sections each including, at least, a weighing machine and a cooperating weighing hopper 80 with two discharge ports 81, 82.

The mode of operation of this embodiment will now be described. It is noted that the weighing sections arranged above the chute 83 are divided into four groups corresponding to the four outer chute sections 85. First, for each group a combinatorial operation is performed on the basis of weight data from those weighing sections which belong to the individual groups so as to determine an optimum combination whose addition value is the closest to a set value for each group. Subsequently, a combinatorial operation is performed in the same manner as above so as to determine an optimum combination for each of the groups of the weighing sections which have not been selected in the preceding combinatorial operation, the groups associated with the inner chute sections 84, respectively. Thus, on the one hand with regard to the four groups of the weighing sections associated with the outer chute sections, the outer discharge ports 82 of the weighing hoppers 80 of the weighing sections constituting the selected optimum combination are opened so that the articles contained therein are discharged toward the associated outer chute sections situated therebelow. With regard to the two groups of the weighing sections associated with the inner chute sections on the other, the inner discharge ports 81 of the weighing hoppers 80 of the weighing sections constituting the selected optimum combination are opened so that the articles contained therein are discharged toward the associated inner chute sections situated therebelow. In this way, the collecting of the six groups of combinations of articles is effected in unison through the six discharge paths. Upon those hoppers 80 which have discharged articles are fed with fresh articles, the same operation as above-described can be repeated.

As is apparent, with the embodiments shown in FIGS. 14 to 19, three or more groups of combinations of articles selected can be discharged in unison through separate discharge paths, ensuring a substantial improvement of the performance. Notwithstanding such advantages, the inventive system is simple in construction and therefore easy to manufacture. The Figures referred to above illustrate the respective chutes as being inverted frusto-conical, but they may of course be of any other shape, such as quadrilateral for instance.

The method of computing combinations in this invention is not limited to the one described herein merely by way of explanation. For example, rather than storing all combination weights which are the results of combinatorial computations, each time the computation of a combination is completed, it is compared with the set weight and only that one of the combinations computed so far which is the nearest to the set weight is stored, so that when all combinations have been computed, a particular combination which is equal or the nearest to the set weight will have been found.

The description so far has been given with reference to combinatorial weighing taken as an example, but the present invention may, of course, be likewise applied to combinatorial counting. More particularly, the invention may be embodied by weighing groups of articles, dividing the weight of each group by the weight of a single article to find the number of articles in each group, performing addition on each combination of the numbers to find a combination equal or closest to a set number, and discharging the articles corresponding to that combination. Therefore, in the present invention, the term "combinatorial weighing" includes the meaning of "combinatorial counting". Combinatorial operation for the latter case may be performed by any desired method. Further, conditions for a set value for discharge may be set as desired, such as number alone or number plus weight.

As many apparently widely different embodiments of this invention may be made without departing from the spirit and scope thereof, it is to be understood that the invention is not limited to the specific embodiments thereof except as defined in the appended claims.

What is claimed is:

1. A combinatorial weighing system comprising a plurality of weighing hoppers each having two discharge ports, a plurality of weighing machines respectively associated with said weighing hoppers for weighing articles received in the latter, an arithmetic section for performing combinatorial operation on the basis of weighed data obtained by said weighing machines to search for a combination whose addition value is equal or the closest to a set value and sending a discharge signal to the weighing hoppers corresponding to the searched-for combination, and a chute having a plurality of separate discharge paths for dropping articles from the weighing hoppers toward at least a timing hopper situated thereunder, wherein the two discharge ports of each weighing hopper are respectively associated with the discharge paths of said chute and said discharge ports are actuated by different signals independently of one another.

2. A system as set forth in claim 1 wherein said chute comprises one inner chute section and one outer chute section.

3. A system as set forth in claim 2 wherein said inner and outer chute sections have an inlet port and a discharge port, said chute sections being substantially of inverted frusto-conical shape and crossing each other so that their inlet ports are arranged in two circles one within the other with their discharge ports laterally spaced from each other.

4. A system as set forth in claim 3 wherein a portion of said outer chute section that surrounds the inner chute section is cut away.

5. A system as set forth in claim 1 wherein said chute comprises one inner chute section and two or more outer chute sections.

6. A system as set forth in claim 1 wherein said chute comprises two or more inner chute sections and two or more outer chute sections.

7. A method of collecting articles in a combinatorial weighing system, comprising the steps of after performing combinatorial operation on the basis of weighed data on articles received in a plurality of weighing hoppers each having two discharge ports to search for an optimum combination, selectively opening either of the two discharge ports of said weighing hoppers corresponding to the optimum combination so that articles are discharged to one of discharge paths respectively associated with the discharge ports of said weighing hoppers, thereby collecting groups of articles discharged successively from the weighing hoppers separately one from the other.

8. An apparatus for collecting articles in a combinatorial weighing system, comprising a chute situated under a plurality of weighing hoppers, each of said weighing hoppers having two discharge ports, said chute having a first discharge path and a second discharge path, the first and the second discharge paths being associated with the two discharge ports of each weighing hopper, respectively.

9. A method of collecting articles in a combinatorial weighing system, comprising the steps of performing combinatorial operation on the basis of weighed data from a fixed number of weighing machines among others to search for a combination whose addition value is equal or the closest to a set value, discharging articles from the weighing machines corresponding to the searched-for combination via a discharge path, computing combinations on the basis of weighing data from the weighing machines other than those which have discharged articles to search for a combination whose addition value is equal or the closest to the set value, and discharging articles from the weighing machines corresponding to the now searched-for combination via a discharge path separate from the first said discharge path.

10. An apparatus for collecting articles in a combinatorial weighing system comprising a chute having an inner and an outer chute section of inverted frusto-conical shape, the chute sections crossing each other so that their upper inlet ports are arranged one within the other with their lower discharge ports laterally spaced from each other, and a plurality of weighing hoppers each having two discharge ports respectively associated with the inlet ports of said chute, wherein a portion of said outer chute section that surrounds the inner chute section to form therein a narrow discharge path is cut away.

* * * * *